United States Patent Office.

LAWRENCE ROY, OF PLATTSBURG, MISSOURI, ASSIGNOR TO HIMSELF AND CHARLES J. NESBITT, OF SAME PLACE.

Letters Patent No. 96,269, dated October 26, 1869.

IMPROVED MEDICINE FOR CANCER.

The Schedule referred to in these Letters Patent and making part of the same.

*To all whom it may concern:*

Be it known that I, LAWRENCE ROY, of Plattsburg, in the county of Clinton, and State of Missouri, have invented a new and improved Process for Treatment of Cancers; and I do hereby declare that the following is a full, clear, and exact description thereof, which will enable others skilled in the art to make and use the same.

This invention and discovery relates to an improvement in the treatment of cancerous diseases; and consists in the use of the substances and compositions in the manner hereinafter described.

In the first place, I apply one or more plasters of caustic potash, in the form or of the consistency of a thick paste, which paste may be prepared by boiling down the lye of wood-ashes, or in any other suitable manner. Three or four of these plasters may be necessary, applied one after the other, at intervals of from fifteen to twenty minutes, (thoroughly cleansing the affected part at each application,) until the cancer becomes a black or bloody mass or lump.

After the cancer has been brought to this condition by means of the above applications, and again thoroughly cleansed, I apply a poultice made from the Aralia racemosa, or American spikenard-root, mixed with a sufficient quantity of sweet milk or cream to form a soft and pleasant poultice.

After applying this poultice twice a day for a few days, the cancer will come out; but during the application a powder is used, (sprinkled upon the poultice and around the cancer,) composed as follows:

One tablespoonful of chloride of sodium, (common salt,) well burned, combined with three other ingredients, (each equal to one-third the bulk of the salt,) namely, alum, saltpetre, and copperas, the whole being well powdered and mixed together.

After the cancer is removed, cover the cavity well with the powder, and apply another poultice of spikenard and sweet milk, and allow it to remain twelve hours, or thereabouts. Remove the poultice and cleanse the sore with castile-soap and water. Then apply linen-lint sufficient to fill the cavity.

The lint is thoroughly saturated with whiskey and honey, and is applied twice a day until the sore is healed.

The powder may be applied occasionally as the sore is dressed with the saturated lint.

Apply no oil or grease of any kind.

In obstinate or extreme cases of cancer, (especially cancer of the breast,) instead of using the potash-application described in the first part of the process, I make use of a lead-powder, composed as follows:

Melt four ounces of lead in a closed vessel, and pour the liquid-metal upon from one and a half to two ounces of sulphur. Shake the compound until it becomes a powder.

After it is cool, make three or four applications of the powder to the cancered breast, or as many applications as will bring the cancer to the condition before stated, that is, presenting the appearance of a black, bloody lump. When it is brought to this stage, pursue the treatment with the poultice and powder before described.

Each lead-powder application should not be allowed to remain over about one-half hour, and the part should be thoroughly cleansed at each removal.

A healing-salve, stained with blue vitriol, may be used when the spikenard-poultice is not effective in removing the cancer.

Having thus described my invention,

I claim as new, and desire to secure by Letters Patent—

1. The combination of a caustic-potash plaster, a spikenard-poultice, and a powder formed of salt, saltpetre, alum, and copperas, each of said three instrumentalities being prepared and applied at the times and in the manner hereinbefore specified, for the treatment of cancer.

2. A compound formed of lead and sulphur, in the respective proportions of two to one, and made to combine in the manner set forth, for the purpose of drawing cancers to a head, in the manner described.

3. A compound formed of burnt common salt, alum, saltpetre, and copperas, in the respective proportions of 3, 1, 1, 1, all mixed and prepared in the form of a powder, as specified, for the purpose of loosening the cancer in its socket.

LAWRENCE X ROY.
his mark.

Witnesses:
CHAS. INGLES,
ALEX. S. HARE.